United States Patent
You et al.

(10) Patent No.: US 10,234,625 B2
(45) Date of Patent: Mar. 19, 2019

(54) DISPLAY APPARATUS

(71) Applicant: Samsung Display Co., Ltd., Yongin-Si, Gyeonggi-Do (KR)

(72) Inventors: Junwoo You, Seongnam-si (KR); Taeho Lee, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/915,240

(22) Filed: Mar. 8, 2018

(65) Prior Publication Data
US 2018/0259705 A1    Sep. 13, 2018

(30) Foreign Application Priority Data
Mar. 10, 2017   (KR) .................. 10-2017-0030834

(51) Int. Cl.
  *F21V 8/00*       (2006.01)
  *G02F 1/1335*     (2006.01)
  *G09F 13/18*      (2006.01)

(52) U.S. Cl.
  CPC ......... *G02B 6/0088* (2013.01); *G02B 6/0055* (2013.01); *G02B 6/0078* (2013.01); *G02F 1/133615* (2013.01); *G09F 13/18* (2013.01)

(58) Field of Classification Search
  None
  See application file for complete search history.

(56) References Cited

U.S. PATENT DOCUMENTS

| | | | |
|---|---|---|---|
| 6,887,631 B2 | 5/2005 | Kiguchi et al. | |
| 7,154,217 B2 | 12/2006 | Bae et al. | |
| 7,374,328 B2 | 5/2008 | Kuroda et al. | |
| 9,627,454 B2 | 4/2017 | Lee et al. | |
| 2011/0037786 A1* | 2/2011 | Hasegawa | G09G 5/10 345/690 |
| 2015/0357392 A1 | 12/2015 | You | |
| 2016/0020261 A1* | 1/2016 | Kim | H01L 27/3227 362/235 |
| 2016/0027378 A1* | 1/2016 | Kim | G02B 6/0055 345/207 |
| 2016/0217750 A1* | 7/2016 | Lee | G09G 3/3406 |

FOREIGN PATENT DOCUMENTS

| | | |
|---|---|---|
| JP | 2004311400 A | 11/2004 |
| JP | 2012132975 A | 7/2012 |
| JP | 5104843 B2 | 12/2012 |
| KR | 1020140086714 A | 7/2014 |
| KR | 1020150142710 A | 12/2015 |

* cited by examiner

Primary Examiner — Elmito Breval
(74) Attorney, Agent, or Firm — Cantor Colburn LLP

(57) ABSTRACT

A display apparatus includes a plurality of pixels disposed in an active area, a plurality of non-pixels disposed in a non-active area adjacent to the active area, and a plurality of light guide members disposed on boundary pixels of the pixels in the active area and which extends into the non-active area and is disposed on the non-pixels in the non-active area. The boundary pixels are adjacent to a boundary between the active area and the non-active area, and the light guide members guide light exiting from the boundary pixels to the non-pixels.

20 Claims, 12 Drawing Sheets

DISPLAY APPARATUS

This application claims priority to Korean Patent Application No. 10-2017-0030834, filed on Mar. 10, 2017, and all the benefits accruing therefrom under 35 U.S.C. § 119, the content of which in its entirety is herein incorporated by reference.

BACKGROUND

1. Field

Exemplary embodiments of the invention relate to a display apparatus and, more particularly, to a display apparatus capable of reducing a bezel area.

2. Description of the Related Art

Generally, a display apparatus includes a display panel in which a display area and a non-display area are defined. The display area displays an image, and the non-display area is disposed around the display area and does not display an image. The display panel includes a plurality of pixels disposed in the display area and a driver disposed in the non-display area. The driver provides control signals to the pixels, and the pixels are driven by the control signals to display an image.

The non-display area is defined as a bezel area. The non-display area in which the driver is disposed should be secured in the display apparatus. Since the non-display area does not display an image, a size of the display area may be limited to the non-display area. Thus, techniques for enlarging the display area by reducing the non-display area have recently been required.

SUMMARY

Exemplary embodiments of the invention may provide a display apparatus capable of reducing a bezel area.

According to an exemplary embodiment, a display apparatus includes a plurality of pixels disposed in an active area, a plurality of non-pixels disposed in a non-active area adjacent to the active area, and a plurality of light guide members disposed on boundary pixels of the pixels in the active area and which extends into the non-active area and is disposed on the non-pixels in the non-active area. The boundary pixels are adjacent to a boundary between the active area and the non-active area, and the light guide members guide light exiting from the boundary pixels to the non-pixels.

According to another exemplary embodiment, a display apparatus includes a plurality of pixels disposed in an active area, a plurality of non-pixels disposed in a non-active area adjacent to the active area and which include light-scattering particles, a plurality of reflective layers disposed under the non-pixels, and a plurality of light guide members disposed on boundary pixels of the pixels in the active area and which extends into the non-active area and is disposed on side surfaces of the non-pixels in the non-active area. The boundary pixels are adjacent to a boundary between the active area and the non-active area. The light guide members guide light exiting from the boundary pixels to the non-pixels, and the light guided to the non-pixels exits from the non-pixels.

BRIEF DESCRIPTION OF THE DRAWINGS

The above and other advantages and features of the present invention will become more apparent by describing in further detail exemplary embodiments thereof with reference to the accompanying drawings, in which.

DETAILED DESCRIPTION

Figure 1:
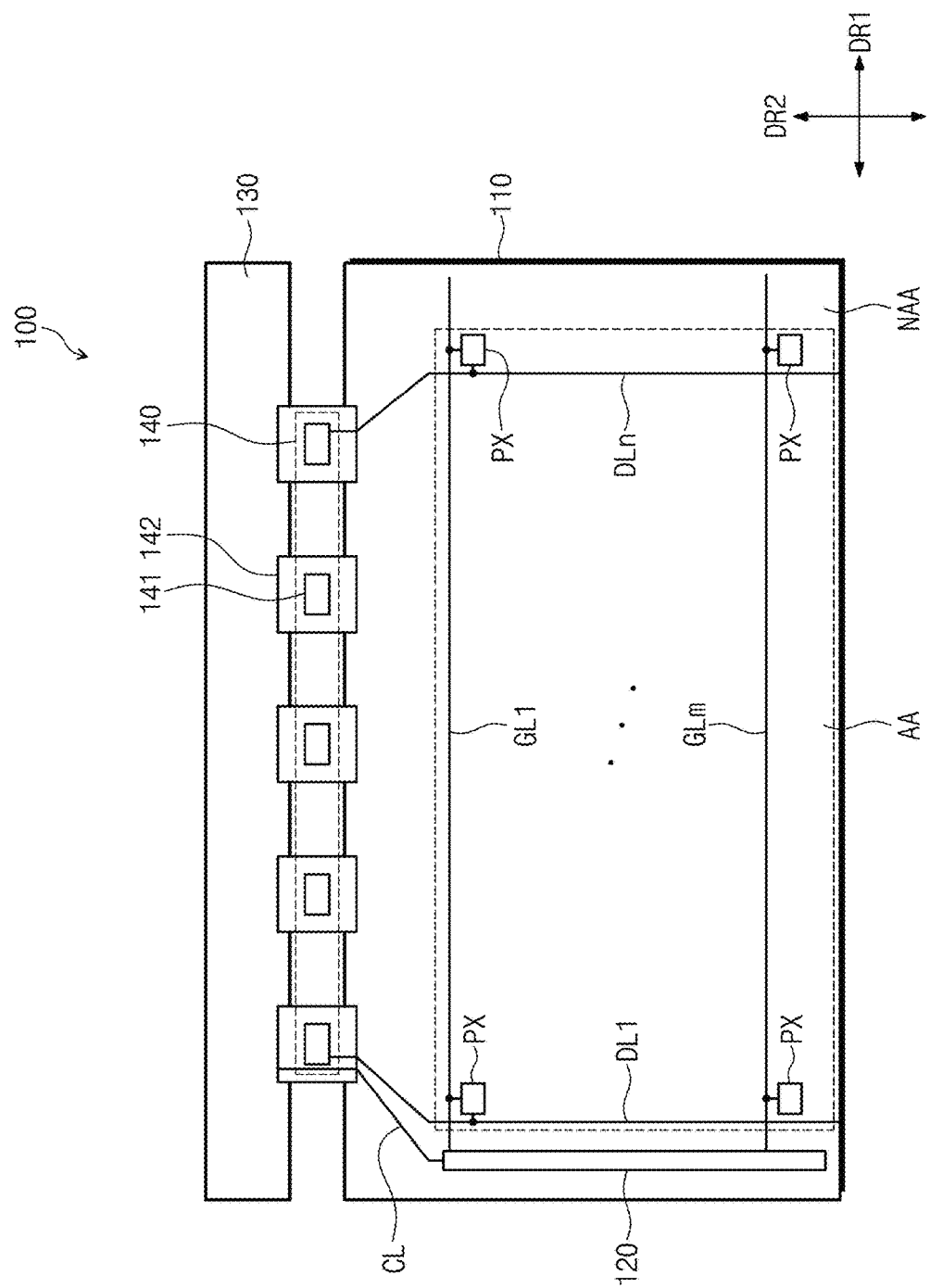
FIG. 1 is a plan view illustrating an exemplary embodiment of a display apparatus according the invention.

The invention now will be described more fully hereinafter with reference to the accompanying drawings, in which various exemplary embodiments are shown. This invention may, however, be embodied in many different forms, and should not be construed as limited to the exemplary embodiments set forth herein. Rather, these exemplary embodiments are provided so that this disclosure will be thorough and complete, and will fully convey the scope of the invention to those skilled in the art. Like reference numerals refer to like elements throughout.

It will be understood that when an element such as a layer, region or substrate is referred to as being "on" another element, it can be directly on the other element or intervening elements may be present. In contrast, the term "directly" means that there are no intervening elements. As used herein, the term "and/or" includes any and all combinations of one or more of the associated listed items. The terminology used herein is for the purpose of describing particular exemplary embodiments only and is not intended to be limiting. As used herein, the singular forms "a," "an," and "the" are intended to include the plural forms, including "at least one," unless the content clearly indicates otherwise.

"Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Exemplary embodiments are described herein with reference to cross-sectional illustrations and/or plane illustrations that are idealized exemplary illustrations. In the drawings, the thicknesses of layers and regions are exaggerated for clarity. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of exemplary embodiments.

Hereinafter, exemplary embodiments of the invention will be described in detail with reference to the accompanying drawings.

FIG. 1 is a plan view illustrating an exemplary embodiment of a display apparatus according to the invention.

Referring to FIG. 1, a display apparatus 100 according to the invention includes a display panel 110, a gate driver 120, a printed circuit board 130, and a data driver 140. The display panel 110 may have a long side parallel to a first direction DR1 and may have a short side parallel to a second direction DR2 intersecting the first direction DR1.

The display panel 110 may be a liquid crystal display panel including a liquid crystal layer. However, the invention is not limited thereto. In certain exemplary embodiments, the display panel 110 may be an organic light-emitting display panel including organic light-emitting elements, an electrophoretic display panel including an electrophoretic layer, or an electrowetting display panel including an electrowetting layer.

Figure 3:
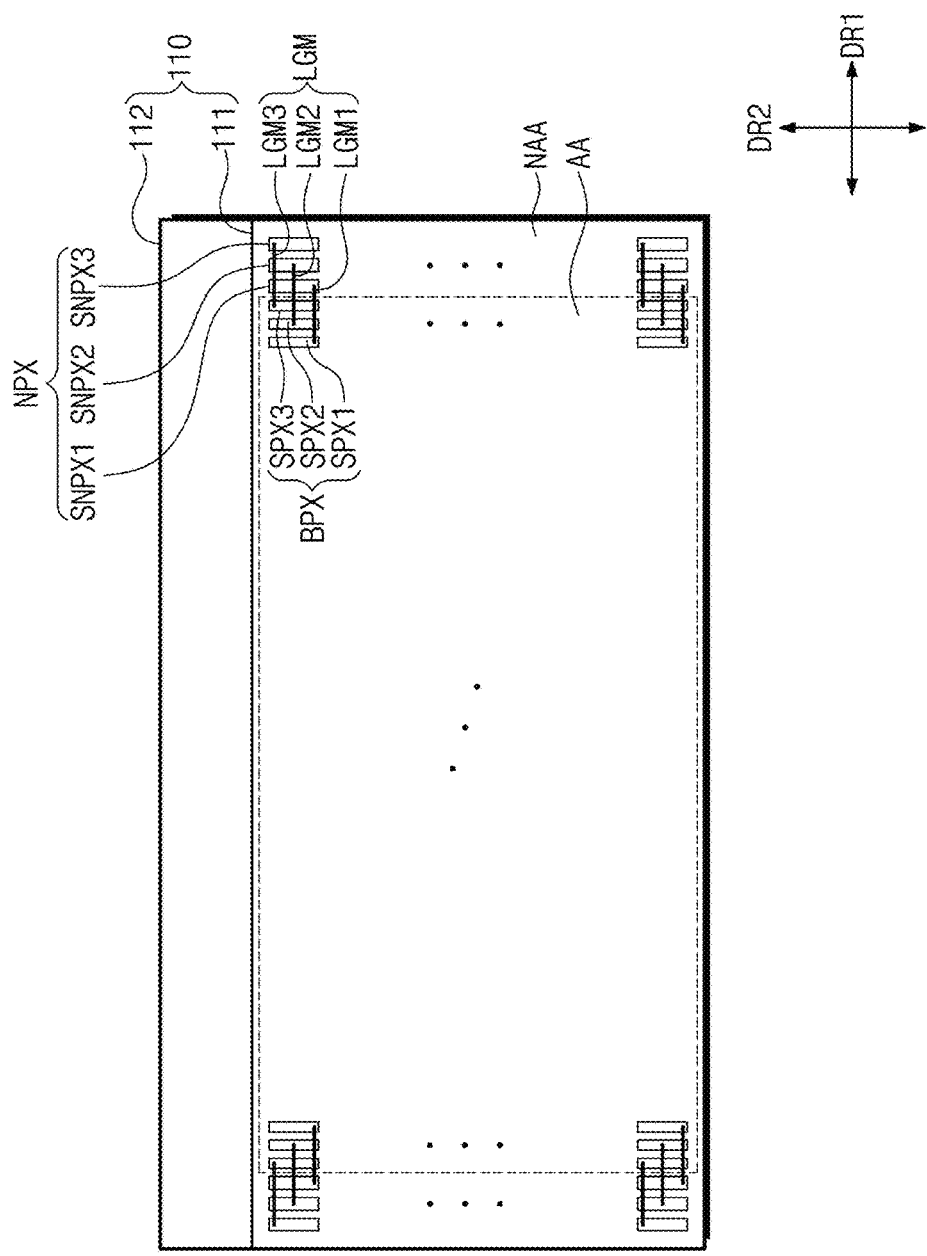
FIG. 3 is a plan view illustrating an exemplary embodiment of arrangement of pixels and non-pixels of a display panel of FIG. 1.

The display panel 110 includes an active area AA and a non-active area NAA adjacent to the active area AA. The display panel 110 may include a plurality of pixels PX, a plurality of gate lines GL1 to GLm, and a plurality of data lines DL1 to DLn. Here, 'm' and 'n' are natural numbers. The pixels PX may be disposed in the active area AA, and non-pixels may be disposed in the non-active area NAA. The non-pixels are illustrated in FIG. 3 and will be described later with reference to FIG. 3.

The gate lines GL1 to GLm are insulated from the data lines DL1 to DLn and intersect the data lines DL1 to DLn. The gate lines GL1 to GLm extend in the first direction DR1 and are connected to the gate driver 120. The data lines DL1 to DLn extend in the second direction DR2 and are connected to the data driver 140.

The pixels PX may be disposed in areas partitioned by the gate lines GL1 to GLm and the data lines DL1 to DLn intersecting the gate lines GL1 to GLm. The pixels PX may be arranged in a matrix form, and each of the pixels PX may be connected to a corresponding gate line among the gate lines GL1 to GLm and a corresponding data line among the data lines DL1 to DLn.

The gate driver 120 may be disposed in a predetermined area of the display panel 110, which is adjacent to a side, of the display panel 110, in the first direction DR1. The gate driver 120 may be formed simultaneously with transistors of the pixels PX by the same manufacturing processes, and thus the gate driver 120 may be mounted on the display panel 110 in an amorphous silicon thin-film transistor ("TFT") gate driver circuit ("ASG") form or an oxide silicon TFT gate driver circuit ("OSG") form.

Alternatively, the gate driver 120 may include a plurality of driving chips, and the plurality of driving chips may be connected to the display panel 110 through flexible printed circuit boards or may be mounted on the display panel 110 by a chip-on-glass ("COG") method.

A timing controller (not shown) may be disposed on the printed circuit board 130. The timing controller may be mounted on the printed circuit board 130 in an integrated circuit chip type and is connected to the gate driver 120 and the data driver 140. The timing controller outputs a gate control signal, a data control signal, and image data.

The gate driver 120 receives the gate control signal from the timing controller through a control line CL. The gate driver 120 may generate a plurality of gate signals in response to the gate control signal and may sequentially output the generated gate signals. The gate signals are provided to the pixels PX through the gate lines GL1 to GLm in the unit of row. Thus, the pixels PX may be driven in the unit of row.

The data driver 140 includes a plurality of source driving chips 141. The source driving chips 141 may be mounted on flexible circuit boards 142 and may be connected to the printed circuit board 130 and a side of the display panel 110 in the second direction DR2 through the flexible circuit boards 142. However, the invention is not limited thereto. In certain exemplary embodiments, the source driving chips 141 of the data driver 140 may be mounted on the display panel 110 by a COG method.

The data driver 140 receives the image data and the data control signal from the timing controller. The data driver 140 generates and outputs analog data voltages corresponding to the image data in response to the data control signal. The data voltages are provided to the pixels PX through the data lines DL1 to DLn.

The pixels PX receive the data voltages through the data lines DL1 to DLn in response to the gate signals provided through the gate lines GL1 to GLm. The pixels PX may display gray scales corresponding to the data voltages, thereby displaying an image.

Figure 2:
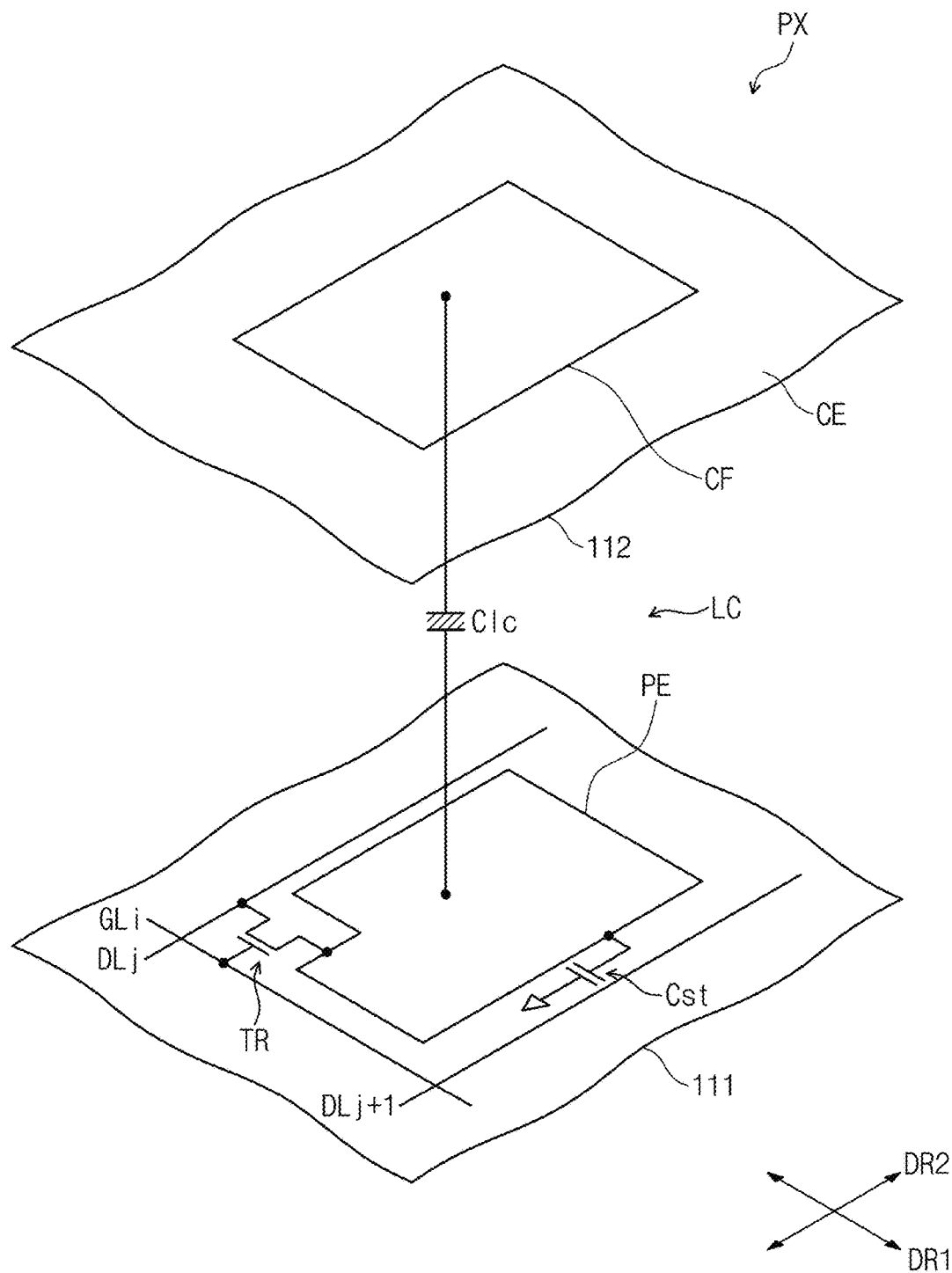
FIG. 2 is a perspective view illustrating an exemplary embodiment of components of one of pixels of FIG. 1.

FIG. 2 is a perspective view illustrating an exemplary embodiment of components of one of pixels of FIG. 1.

FIG. 2 illustrates a pixel PX connected to a gate line GLi and a data line DLj for the purpose of ease and convenience in description. Even though not shown in the drawings, components of each of other pixels PX of the display panel 110 may be the same as those of the pixel PX illustrated in FIG. 2.

Referring to FIG. 2, the pixel PX may be a pixel used in a liquid crystal display panel. In this case, even though not shown in the drawings, the display apparatus 100 may further include a backlight unit that is disposed at the back of the display panel 110 to provide light to the display panel 110.

The pixel PX may include a first substrate 111 including a driving element for driving the pixel PX, a second substrate 112 on which a color filter CF is disposed, and a liquid crystal layer LC disposed between the first substrate 111 and the second substrate 112.

In more detail, the pixel PX includes a transistor TR connected to the gate line GLi and the data line DLj, a liquid crystal capacitor Clc connected to the transistor TR, and a storage capacitor Cst connected in parallel to the liquid crystal capacitor Clc. In certain exemplary embodiments, the storage capacitor Cst may be omitted. Here, 'i' and 'j' are natural numbers. The transistor TR may be the driving element.

The transistor TR may be disposed on the first substrate 111. The transistor TR includes a gate electrode connected to the gate line GLi, a source electrode connected to the data line DLj, and a drain electrode connected to the liquid crystal capacitor Clc and the storage capacitor Cst.

The liquid crystal capacitor Clc includes a pixel electrode PE disposed on the first substrate 111, a common electrode CE disposed on the second substrate 112, and the liquid crystal layer LC disposed between the pixel electrode PE and the common electrode CE. The liquid crystal layer LC acts as a dielectric material. The pixel electrode PE is connected to the drain electrode of the transistor TR.

In FIG. 2, the pixel electrode PE has a non-slit structure. However, the invention is not limited thereto. In certain exemplary embodiments, the pixel electrode PE may have a slit structure that includes a cross-shaped stem portion and a plurality of branch portions radially extending from the stem portion.

The common electrode CE may be disposed on an entire portion of the second substrate 112. In an exemplary embodiment, for example, the common electrode CE may be disposed on an entire bottom surface of the second substrate 112. However, the invention is not limited thereto. In another exemplary embodiment, the common electrode CE may be disposed on the first substrate 111. In this case, at least one of the pixel electrode PE or the common electrode CE may include a slit.

The storage capacitor Cst may include the pixel electrode PE, a storage electrode (not shown) branched from a storage line (not shown), and an insulating layer disposed between the pixel electrode PE and the storage electrode. The storage line may be disposed on the first substrate 111 and may be formed simultaneously with the gate lines GL1 to GLm in the same layer. The storage electrode may partially overlap with the pixel electrode PE.

The pixel PX may include the color filter CF showing one of a red color, a green color, and a blue color. In an exemplary embodiment, for example, the color filter CF may be disposed on the second substrate 112, as illustrated in FIG. 2. However, the invention is not limited thereto. In certain exemplary embodiments, the color filter CF may be disposed on the first substrate 111.

The transistor TR is turned-on in response to the gate signal provided through the gate line GLi. The data voltage received through the data line DLj is provided to the pixel electrode PE of the liquid crystal capacitor Clc through the turned-on transistor TR. A common voltage is applied to the common electrode CE.

An electric field is formed between the pixel electrode PE and the common electrode CE by a difference in voltage level between the data voltage and the common voltage. Liquid crystal molecules of the liquid crystal layer LC are driven by the electric field formed between the pixel electrode PE and the common electrode CE. A light transmittance may be adjusted or controlled by orientation of the liquid crystal molecules driven by the electric field, thereby displaying an image.

A storage voltage having a constant voltage level may be applied to the storage line. However, the invention is not limited thereto. In certain exemplary embodiments, the common voltage may be applied to the storage line. The storage capacitor Cst compensates for the lack of the charging rate of the liquid crystal capacitor Clc.

FIG. 3 is a plan view illustrating an exemplary embodiment of arrangement of pixels and non-pixels of a display panel of FIG. 1.

Referring to FIG. 3, the display panel 110 may include the first substrate 111 and the second substrate 112 which face each other, and the second substrate 112 may be larger than the first substrate 111 in the second direction DR2. Even though not shown in the drawings, the gate driver 120 may be mounted on the first substrate 111, and the data driver 140 may be connected to the first substrate 111.

The display panel 110 includes a plurality of non-pixels NPX and a plurality of light guide members LGM. The non-pixels NPX are disposed in the non-active area NAA. Hereinafter, the pixels PX, adjacent to a boundary between the active area AA and the non-active area NAA, of the plurality of pixels PX are defined as boundary pixels BPX.

The light guide members LGM guide light, which exits from the boundary pixels BPX, to the non-pixels NPX.

The light guide members LGM are disposed on the boundary pixels BPX and extend into the non-active area NAA in the first direction DR1. The light guide members LGM extended in the non-active area NAA are disposed on the non-pixels NPX. In more detail, each of the light guide members LGM is disposed on a portion of a corresponding one of the boundary pixels BPX, extends into the non-active area NAA, and is also disposed on a portion of a corresponding one of the non-pixels NPX.

Each of the light guide members LGM guides light exiting from the corresponding boundary pixel BPX to the corresponding non-pixel NPX. The light guided to the non-pixels NPX may be diffused in the non-pixels NPX and then may exit to the outside.

Light generated from the pixels PX may exit in an upward direction (i.e., front direction in a plan view), and light transmitted from the non-pixels NPX may also exit in the upward direction. Thus, an image may be displayed on the non-active area NAA as well as the active area AA. As a result, a bezel area can be reduced. The image may be substantially displayed on the non-active area NAA disposed at both sides of the active area AA in the first direction DR1, and thus the non-active area NAA adjacent to both sides of the active area AA in the first direction DR1 can be realized as 'zero bezel'.

Each of the boundary pixels BPX includes a first sub-pixel SPX1, a second sub-pixel SPX2 and a third sub-pixel SPX3 which are sequentially arranged in the first direction DR1. The first sub-pixel SPX1, the second sub-pixel SPX2 and the third sub-pixel SPX3 may display different colors from each other. In an exemplary embodiment, for example, the first sub-pixel SPX1 may display a red color, the second sub-pixel SPX2 may display a green color, and the third sub-pixel SPX3 may display a blue color.

Each of the non-pixels NPX includes a first sub-non-pixel SNPX1, a second sub-non-pixel SNPX2 and a third sub-non-pixel SNPX3 which are sequentially arranged in the first direction DR1. The first, second and third sub-non-pixels SNPX1, SNPX2 and SNPX3 may be disposed to correspond to the first, second and third sub-pixels SPX1, SPX2 and SPX3, respectively.

Gate signals and data voltages are not applied to the first, second and third sub-non-pixels SNPX1, SNPX2 and SNPX3. Driving elements such as transistors TR are not disposed in the first, second and third sub-non-pixels SNPX1, SNPX2 and SNPX3. Pixel electrodes PE are not disposed in the first, second and third sub-non-pixels SNPX1, SNPX2 and SNPX3. Since the first, second and third sub-non-pixels SNPX1, SNPX2 and SNPX3 only output the light provided from the boundary pixel BPX, sizes of the first, second and third sub-non-pixels SNPX1, SNPX2 and SNPX3 are not limited to specific sizes.

Thus, as illustrated in FIG. 3, a size of each of the first, second and third sub-non-pixels SNPX1, SNPX2 and SNPX3 may be greater than a size of each of the first, second and third sub-pixels SPX1, SPX2 and SPX3, respectively. However, the invention is not limited thereto. In another exemplary embodiment, the size of each of the first, second and third sub-non-pixels SNPX1, SNPX2 and SNPX3 may be equal to the size of each of the first, second and third sub-pixels SPX1, SPX2 and SPX3, respectively.

Each of the light guide members LGM includes a first light guide member LGM1, a second light guide member LGM2, and a third light guide member LGM3. The first light guide member LGM1 is disposed on the first sub-pixel SPX1, extends into the non-active area NAA, and is also disposed on the first sub-non-pixel SNPX1. The first light guide member LGM1 guides light exiting from the first sub-pixel SPX1 to the first sub-non-pixel SNPX1.

The second light guide member LGM2 is disposed on the second sub-pixel SPX2, extends into the non-active area NAA, and is also disposed on the second sub-non-pixel SNPX2. The second light guide member LGM2 guides light exiting from the second sub-pixel SPX2 to the second sub-non-pixel SNPX2.

The third light guide member LGM3 is disposed on the third sub-pixel SPX3, extends into the non-active area NAA, and is also disposed on the third sub-non-pixel SNPX3. The third light guide member LGM3 guides light exiting from the third sub-pixel SPX3 to the third sub-non-pixel SNPX3.

Figure 4:
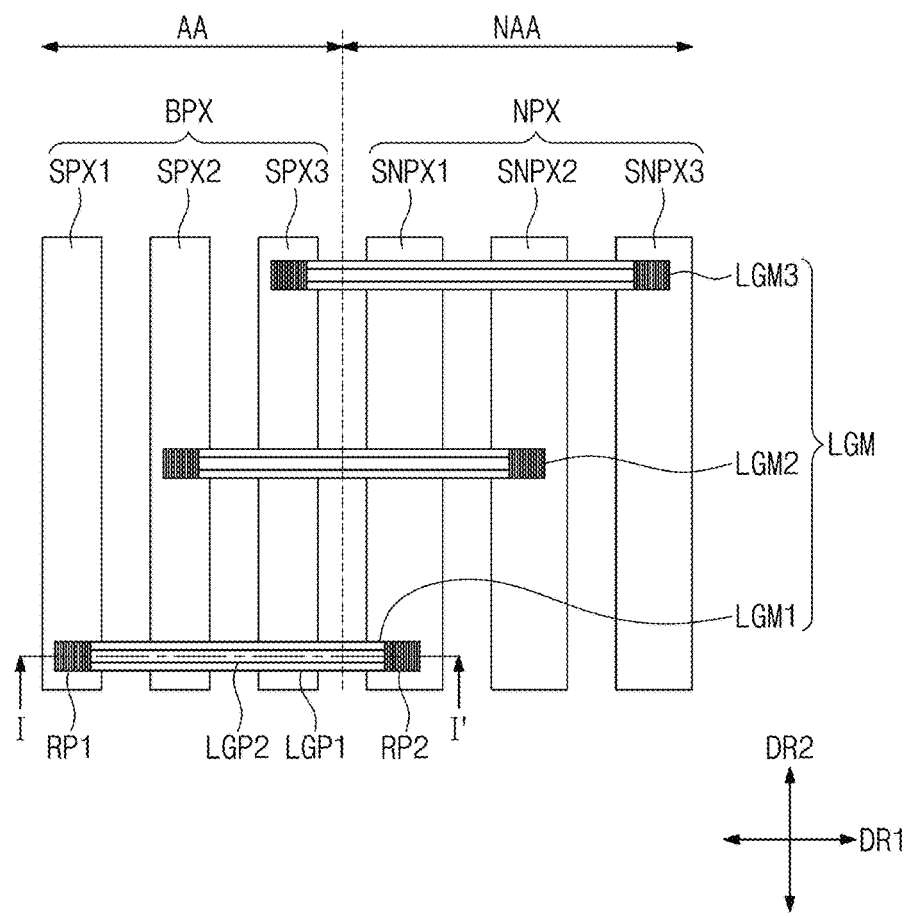
FIG. 4 is an enlarged view of an exemplary embodiment of one boundary pixel, one non-pixel and one light guide member in the display panel of FIG. 3.
Figure 5:
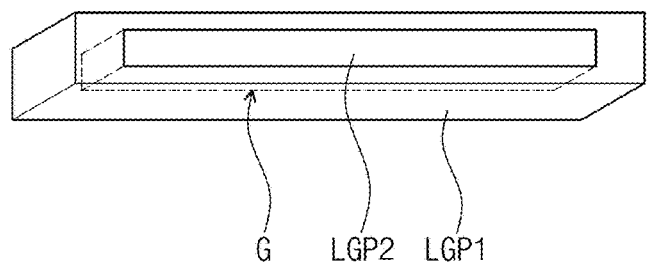
FIG. 5 is a perspective view illustrating an exemplary embodiment of the first light guide part and the second light guide part of FIG. 4.
Figure 6:
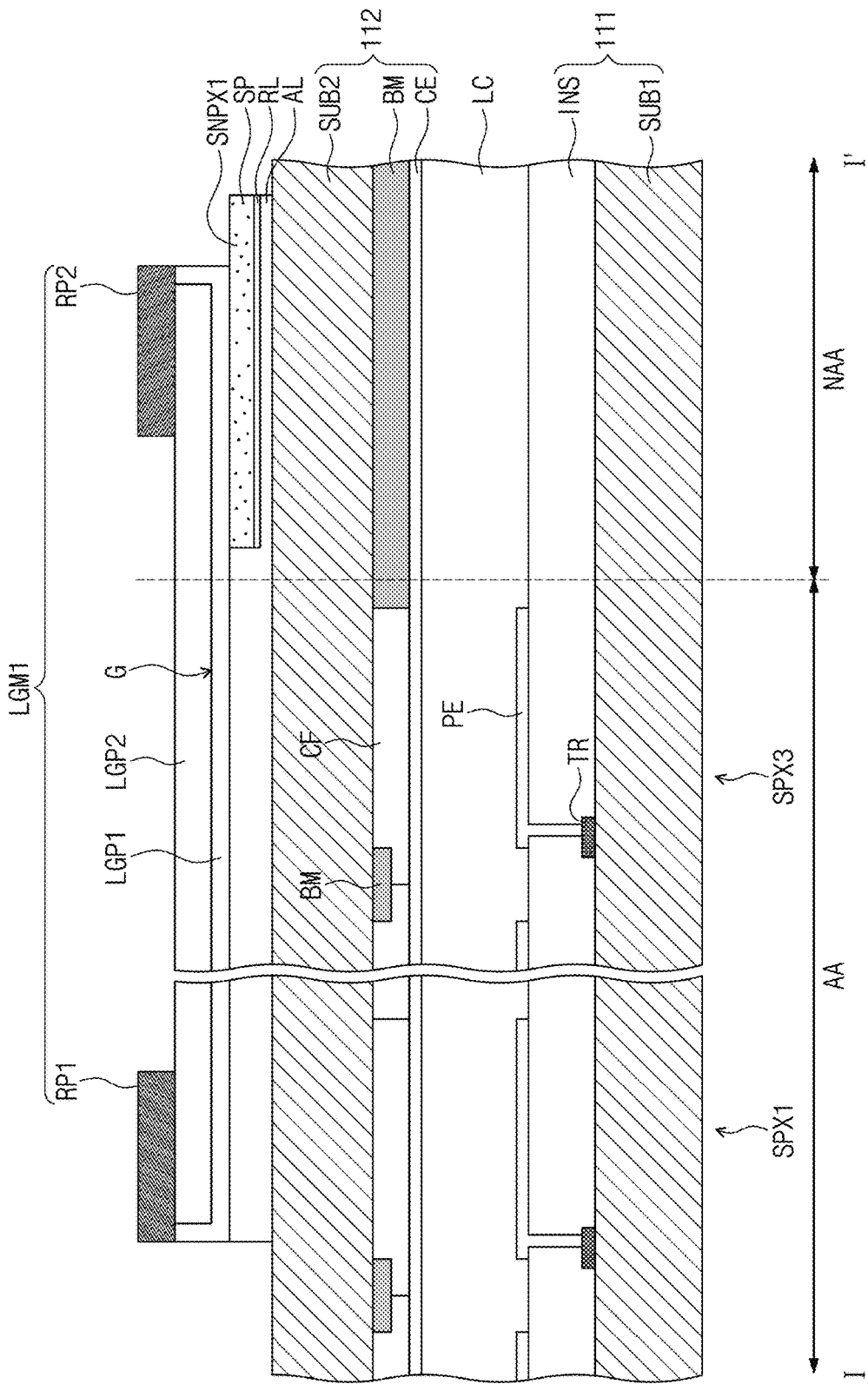
FIG. 6 is a cross-sectional view taken along line I-I' of FIG. 4.

FIG. 4 is an enlarged view of an exemplary embodiment of one boundary pixel, one non-pixel and one light guide member in the display panel of FIG. 3. FIG. 5 is a perspective view illustrating an exemplary embodiment of the first light guide part and the second light guide part of FIG. 4. FIG. 6 is a cross-sectional view taken along line I-I' of FIG. 4.

Referring to FIGS. 4, 5, and 6, the first light guide member LGM1 is disposed on a predetermined portion of the first sub-pixel SPX1, extends into the non-active area NAA, and is also disposed on a predetermined portion of the first sub-non-pixel SNPX1. The second light guide member LGM2 is disposed on a predetermined portion of the second sub-pixel SPX2, extends into the non-active area NAA, and is also disposed on a predetermined portion of the second sub-non-pixel SNPX2. The third light guide member LGM3 is disposed on a predetermined portion of the third sub-pixel SPX3, extends into the non-active area NAA, and is also disposed on a predetermined portion of the third sub-non-pixel SNPX3.

In other words, the first, second and third light guide members LGM1, LGM2 and LGM3 do not entirely overlap with but partially overlap with the first, second and third sub-pixels SPX1, SPX2 and SPX3 and the first, second and third sub-non-pixels SNPX1, SNPX2 and SNPX3.

The first substrate 111 may include a first base substrate SUB1, the transistors TR disposed on the first base substrate SUB1, an insulating layer INS disposed on the first base substrate SUB1 to cover the transistors TR, and the pixel electrodes PE disposed on the insulating layer INS. The pixel electrodes PE are connected to the transistors TR through holes penetrating the insulating layer INS.

The second substrate 112 may include a second base substrate SUB2, color filters CF and a black matrix BM disposed under the second base substrate SUB2, and the common electrode CE disposed under the color filters CF and the black matrix BM. The transistors TR, the pixel electrodes PE and the color filters CF may be components of the first, second and third sub-pixels SPX1, SPX2 and SPX3. The transistors TR, the pixel electrodes PE and the color filters CF are disposed only in the active area AA, not in the non-active area NAA, and the black matrix BM is disposed under the second base substrate SUB2 in the non-active area NAA.

The first, second and third light guide members LGM1, LGM2 and LGM3 may be disposed on the second substrate 112. Each of the first, second and third light guide members LGM1, LGM2 and LGM3 includes a first reflection part RP1, a second reflection part RP2, a first light guide part LGP1, and a second light guide part LGP2. The first reflection part RP1, the second reflection part RP2, the first light guide part LGP1 and the second light guide part LGP2 may be disposed on the second substrate 112. A refractive index of the second light guide part LGP2 is greater than a refractive index of the first light guide part LGP1.

The first, second and third sub-non-pixels SNPX1, SNPX2 and SNPX3 may be disposed on the second substrate 112. Each of the first reflection parts RP1 is disposed on a corresponding one of the first, second and third sub-pixels SPX1, SPX2 and SPX3. Each of the second reflection parts RP2 is disposed on a corresponding one of the first, second and third sub-non-pixels SNPX1, SNPX2 and SNPX3. Each of the first light guide parts LGP1 and each of the second light guide parts LGP2 are disposed between the corresponding sub-pixel and the first reflection part RP1 in the active area AA and extend in the first direction DR1.

Each of the first light guide parts LGP1 and each of the second light guide parts LGP2 extending in the first direction DR1 may extend into the non-active area NAA and be disposed between the corresponding sub-non-pixel and the second reflection part RP2 in the non-active area NAA. As shown in FIG. 5, the second light guide part LGP2 may be disposed in a groove G that is recessed downward from a predetermined area of a top surface of the first light guide part LGP1.

Each of the first, second and third sub-non-pixels SNPX1, SNPX2 and SNPX3 includes a plurality of scattering particles SP scattering light. A reflective layer RL reflecting light is disposed under each of the first, second and third sub-non-pixels SNPX1, SNPX2 and SNPX3.

The light guide members LGM and the non-pixels NPX may be adhered on the second substrate 112 by an adhesive layer AL. In more detail, the adhesive layer AL may be disposed under each of the first light guide parts LGP1 and each of the first to third sub-non-pixels SNPX1 to SNPX3, and the first light guide parts LGP1 and the first to third sub-non-pixels SNPX1 to SNPX3 may be adhered to a top surface of the second substrate 112 by the adhesive layer AL.

The first reflection parts RP1 of each of the light guide members LGM may be defined as a first reflection member, the second reflection parts RP2 of each of the light guide members LGM may be defined as a second reflection member, and the first and second light guide parts LGP1 and LGP2 of each of the light guide members LGM may be defined as a light guide layer. Thus, each of the light guide members LGM may include the first reflection member disposed on the corresponding boundary pixel BPX, the second reflection member disposed on the corresponding non-pixel NPX, and the light guide layer disposed between the corresponding boundary pixel BPX and the first reflection member, extending into the non-active area NAA, and also disposed between the corresponding non-pixel NPX and the second reflection member.

Light exiting from the boundary pixels BPX is reflected by the first reflection members of the light guide members LGM such that the reflected light is provided into the light guide layers, and the light guide layers guide the light to the non-active area NAA. The light guided to the non-active area NAA is reflected by the second reflection members such that the guided light is provided to the non-pixels NPX. The light provided to the non-pixels NPX may be scattered in the non-pixels NPX and then may exit from the non-pixels NPX. This operation will be described later in more detail with reference to FIG. 9.

Figure 7:
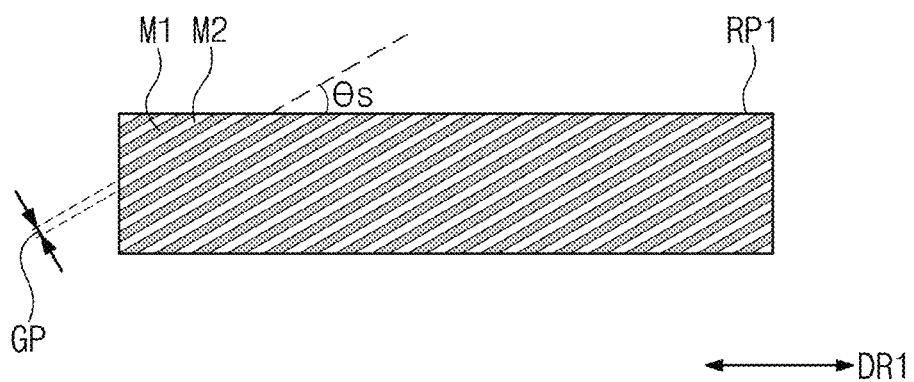
FIGS. 7 and 8 are enlarged views of an exemplary embodiment of first and second reflection parts illustrated in FIG. 6.
Figure 8:
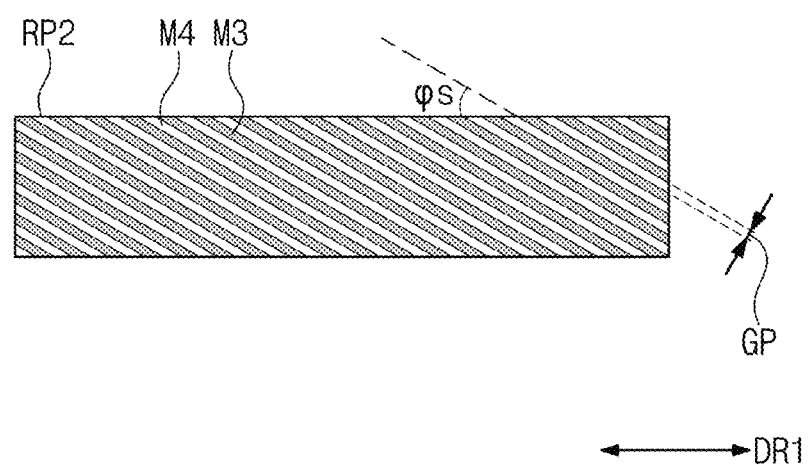

FIGS. 7 and 8 are enlarged views of an exemplary embodiment of first and second reflection parts illustrated in FIG. 6.

Referring to FIGS. 7 and 8, the first reflection part RP1 may include a plurality of first mediums M1 and a plurality of second mediums M2 of which a refractive index is different from that of the first mediums M1. The first mediums M1 and the second mediums M2 may have the same thickness and be alternately disposed.

The first mediums M1 and the second mediums M2 may be disposed to have a predetermined angle θs with respect to the first direction DR1 and are disposed to be inclined toward the non-active area NAA such that light reflected from the first reflection part RP1 may be transmitted to the non-active area NAA through the light guide layer. The angle θs may range from about 20 degrees to about 40 degrees. The refractive index of each of the first mediums M1 may be greater than the refractive index of each of the second mediums M2. A gap GP between the first mediums M1 adjacent to each other may range from about 400 nanometers to about 700 nanometers.

The second reflection part RP2 may include a plurality of third mediums M3 and a plurality of fourth mediums M4 of which a refractive index is different from that of the third mediums M3. The third mediums M3 and the fourth mediums M4 may have the same thickness and are alternately disposed.

The third mediums M3 and the fourth mediums M4 may be disposed to have a predetermined angle φs with respect to the first direction DR1 and are disposed to be inclined toward the active area AA such that the light transmitted through the light guide layer may be reflected to the sub-non-pixel SNPX1. The refractive index of each of the third mediums M3 may be greater than the refractive index of each of the fourth mediums M4. A gap GP between the third mediums M3 adjacent to each other may range from about 400 nanometers to about 700 nanometers.

The third and fourth mediums M3 and M4 and the first and second mediums M1 and M2 may be disposed to be symmetrical with respect to a center of the second light guide part LGP2 corresponding thereto. The refractive indexes of the first mediums M1 may be equal to the refractive indexes of the third mediums M3, and the refractive indexes of the second mediums M2 may be equal to the refractive indexes of the fourth mediums M4. However, invention is not limited thereto. In certain exemplary embodiments, the refractive indexes of the first mediums M1 may be different from the refractive indexes of the third mediums M3, and the refractive indexes of the second mediums M2 may be different from the refractive indexes of the fourth mediums M4.

The first reflection part RP1 and the second reflection part RP2 may be volumetric holographic gratings ("VHGs") used in a holographic optical device. The volumetric holographic grating may transmit or reflect light to diffract light. For example, a grating structure in which mediums having different refractive indexes are alternately disposed may be used to implement the volumetric holographic grating.

When a traveling direction of light is parallel to extending directions of the mediums, the light passes through the mediums. When the traveling direction of the light is perpendicular to the extending directions of the mediums, the light is reflected by the mediums. In addition, when the traveling direction of the light has an angle less than 90 degrees and greater than 0 degree with respect to the extending directions of the mediums, the light may be reflected by the mediums in such a way that an incidence angle of the light is equal to a reflection angle of the light. The volumetric holographic grating is known in the art, and thus other descriptions thereto are omitted.

Figure 9:
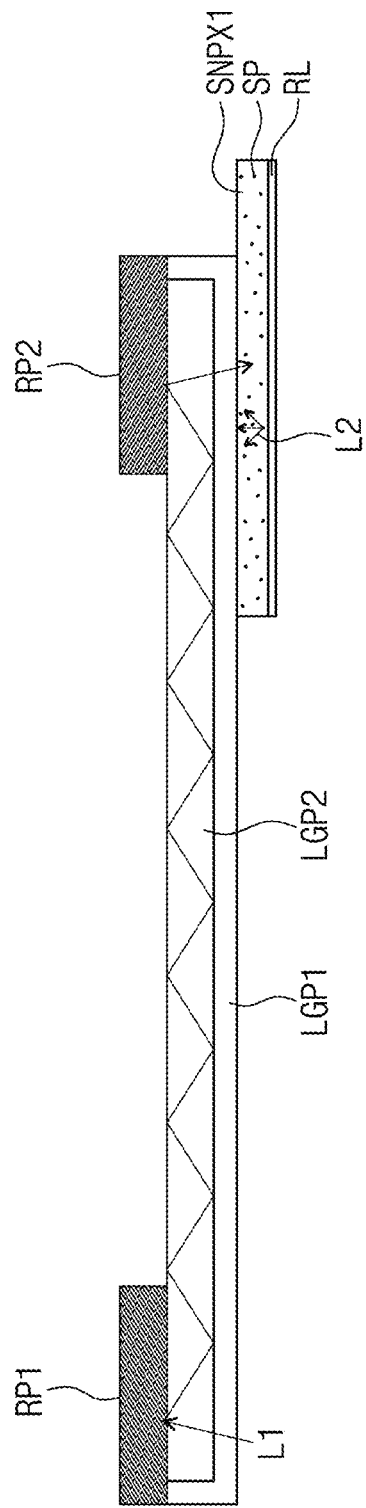
FIG. 9 is a view illustrating an exemplary embodiment of a trajectory of light guided by the light guide member of FIG. 4.

FIG. 9 is a view illustrating an exemplary embodiment of a trajectory of light guided by the light guide member of FIG. 4.

For the purpose of ease and convenience in description and illustration, the display panel 110 and the boundary pixel BPX are omitted in FIG. 9 and the first light guide member LGM1 of the light guide member LGM of FIG. 6 is illustrated in FIG. 9.

Referring to FIG. 9, first light L1 exiting from the first sub-pixel SPX1 may be provided to the first reflection part RP1 of the first light guide member LGM1. Other light exiting from the first sub-pixel SPX1 may exit in an upward direction at a portion of the first sub-pixel SPX1, on which the first light guide member LGM1 is not disposed. Thus, even though the first light guide member LGM1 is disposed on the first sub-pixel SPX1, an image may be displayed through the first sub-pixel SPX1 by the other light.

The first light L1 may be reflected by the first reflection part RP1 and then be provided into the second light guide part LGP2. The refractive index of the second light guide part LGP2 may be greater than the refractive index of the first light guide part LGP1. In addition, the refractive index of the second light guide part LGP2 is greater than that of an air layer disposed on the second light guide part LGP2. Thus, the first light L1 provided into the second light guide part LGP2 may be totally reflected to be guided into the non-active area NAA. The first light L1 guided into the non-active area NAA may be reflected by the second reflection part RP2 and then be provided into the first sub-non-pixel SNPX1.

The first light L1 provided in the first sub-non-pixel SNPX1 may be scattered by the scattering particles SP of the first sub-non-pixel SNPX1 and then may exit as second light L2. The second light L2 which is scattered by the scattering particles SP of the first sub-non-pixel SNPX1 and then travels downward may be reflected by the reflective layer RL and then may travel in the upward direction.

The second light L2 may exit upward from a portion of the first sub-non-pixel SNPX1, on which the first light guide member LGM1 is not disposed. In addition, the second light L2 traveling in parallel to the extending direction of the third and fourth mediums M3 and M4 may pass through the second reflection part RP2 to exit to the outside.

As illustrated in FIG. 4, the second and third light guide members LGM2 and LGM3 extend to overlap with predetermined portions of the first sub-non-pixel SNPX1. Thus, the second light L2 exiting from the first sub-non-pixel SNPX1 may be provided to the first and second light guide parts LGP1 and LGP2 of the second and third light guide members LGM2 and LGM3. However, in this case, the second light L2 may pass through the first and second light guide parts LGP1 and LGP2 in accordance with the traveling direction of the second light L2 since the first or second reflection part RP1 or RP2 of the second or third light guide member LGM2 or LGM3 does not overlap with the first sub-non-pixel SNPX1. Thus, the second light L2 may exit from the first sub-non-pixel SNPX1 to display an image.

Even though not shown in the drawings, the second and third sub-non-pixels SNPX2 and SNPX3 may receive light exiting from the second and third sub-pixels SPX2 and SPX3 through the second and third light guide members LGM2 and LGM3, respectively, and may output the received light to display an image.

Light exiting from the boundary pixels BPX are provided to the non-pixels NPX disposed in the non-active area NAA through the light guide members LGM, and the light provided in the non-pixels NPX exits from the non-pixels NPX to the outside. Thus, an image may be displayed through the non-pixels NPX. As a result, it is possible to reduce the bezel area of the display apparatus 100 according to the invention.

Figure 10:
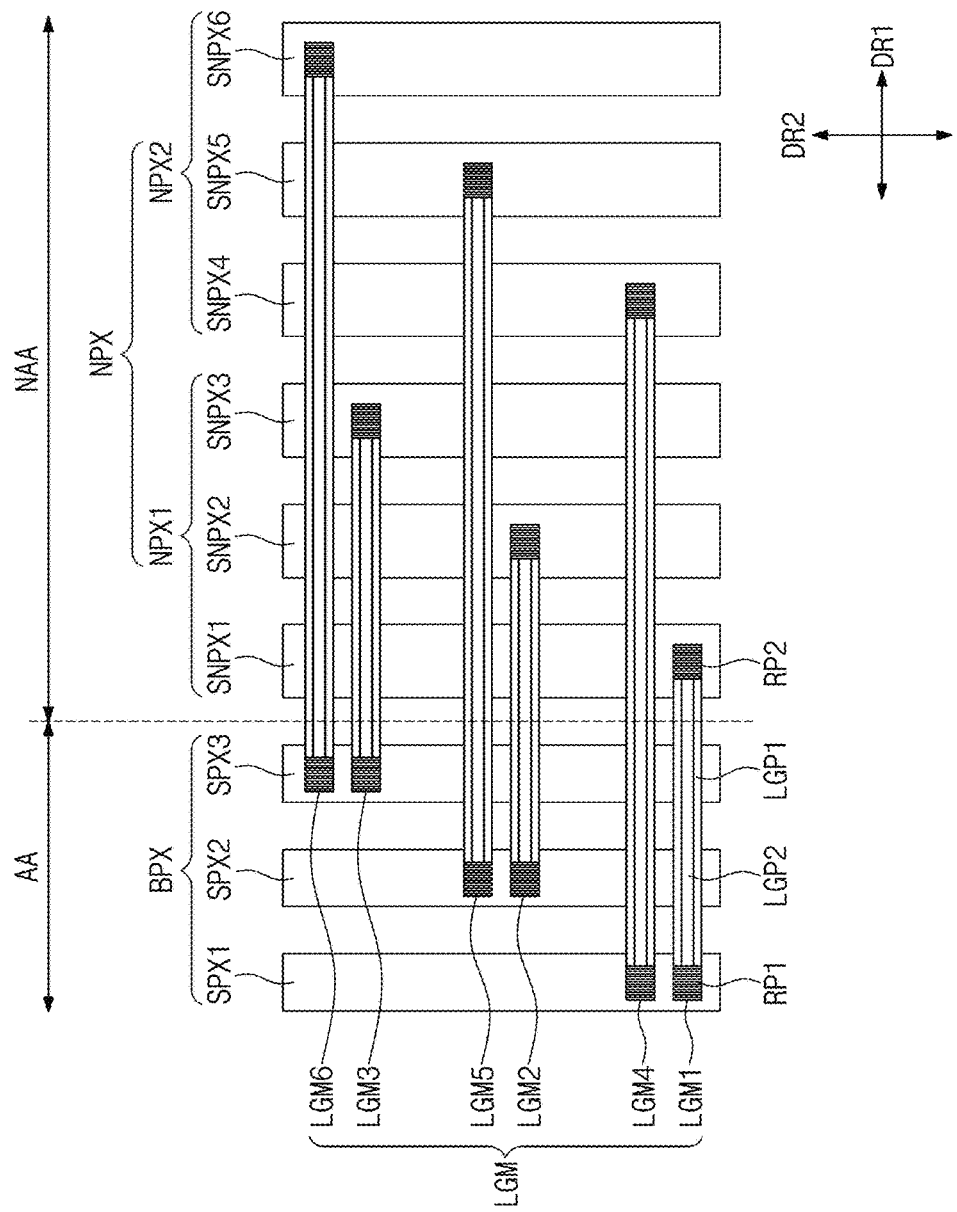
FIG. 10 is a plan view illustrating an exemplary embodiment of arrangement of a boundary pixel, a non-pixel and a light guide member of a display apparatus according to the invention.

FIG. 10 is a plan view illustrating an exemplary embodiment of arrangement of a boundary pixel, a non-pixel and a light guide member of a display apparatus according to the invention.

For the purpose of ease and convenience in description, FIG. 10 illustrates a view corresponding to FIG. 4.

Referring to FIG. 10, a non-pixel NPX may include first to N-th non-pixels. Here, 'N' is a natural number greater than 1. A light guide member LGM may guide light exiting from the boundary pixel BPX to the first to N-th non-pixels.

In an exemplary embodiment, for example, when 'N' is 2, the non-pixel NPX includes a first non-pixel NPX1 and a second non-pixel NPX2 which are arranged in the first direction DR1. The first non-pixel NPX1 is disposed between the boundary pixel BPX and the second non-pixel NPX2. The light guide member LGM may guide light exiting from the boundary pixel BPX to the first non-pixel NPX1 and the second non-pixel NPX2.

In this case, the light guide member LGM may include first to sixth light guide members LGM1 to LGM6, and the boundary pixel BPX includes the first, second and third sub-pixels SPX1, SPX2 and SPX3. The first non-pixel NPX1 may include first, second and third sub-non-pixels SNPX1, SNPX2 and SNPX3, and the second non-pixel NPX2 includes fourth, fifth and sixth sub-non-pixels SNPX4, SNPX5 and SNPX6.

Arrangement of the first, second and third light guide members LGM1, LGM2 and LGM3 regarding the first, second and third sub-pixels SPX1, SPX2 and SPX3 and the first, second and third sub-non-pixels SNPX1, SNPX2 and SNPX3 may be substantially the same as described with reference to FIG. 4, and thus the descriptions thereto are omitted.

The fourth light guide member LGM4 is disposed on the first sub-pixel SPX1, extends into the non-active area NAA, and is also disposed on the fourth sub-non-pixel SNPX4. The fourth light guide member LGM4 guides light exiting from the first sub-pixel SPX1 to the fourth sub-non-pixel SNPX4.

The fifth light guide member LGM5 is disposed on the second sub-pixel SPX2, extends into the non-active area NAA, and is also disposed on the fifth sub-non-pixel SNPX5. The fifth light guide member LGM5 guides light exiting from the second sub-pixel SPX2 to the fifth sub-non-pixel SNPX5.

The sixth light guide member LGM6 is disposed on the third sub-pixel SPX3, extends into the non-active area NAA, and is also disposed on the sixth sub-non-pixel SNPX6. The sixth light guide member LGM6 guides light exiting from the third sub-pixel SPX3 to the sixth sub-non-pixel SNPX6.

Since a size of the non-active area NAA is changed according to the display apparatus, the number of the non-pixels disposed in the non-active area NAA may be increased depending on the size of the non-active area NAA, as illustrated in FIG. 10.

Components of each of the first to sixth light guide members LGM1 to LGM6 and components of each of the first to sixth sub-non-pixels SNPX1 to SNPX6 are substantially the same as those of the first light guide member LGM1 and those of the first sub-non-pixel SNPX1 illustrated in FIG. 6. In addition, like FIG. 6, the reflective layer RL may be disposed under each of the first to sixth sub-non-pixels SNPX1 to SNPX6. Thus, the light guided to the first and second non-pixels NPX1 and NPX2 may exit to the outside. Even though the exemplary embodiment when N=2 is illustrated in FIG. 10, the invention is not limited thereto. Another exemplary embodiment where N is more than 2 can be implemented with the same way as used in FIG. 10.

Figure 11:
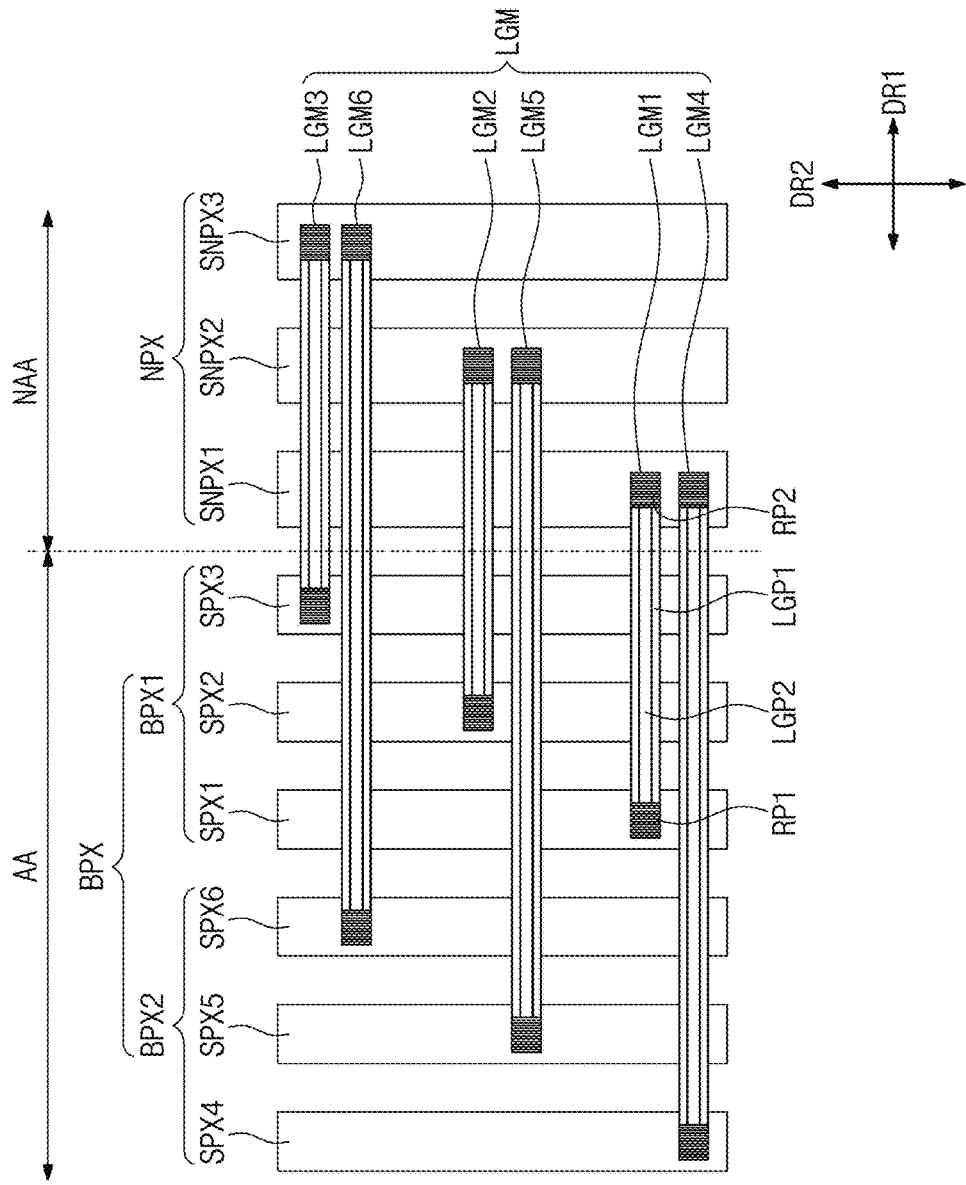
FIG. 11 is a plan view illustrating another exemplary embodiment of arrangement of a boundary pixel, a non-pixel and a light guide member of a display apparatus according to the invention.

FIG. 11 is a plan view illustrating another exemplary embodiment of arrangement of a boundary pixel, a non-pixel and a light guide member of a display apparatus according to the invention.

For the purpose of ease and convenience in description, FIG. 11 illustrates a view corresponding to FIG. 4.

Referring to FIG. 11, a boundary pixel BPX may include first to N-th boundary pixels. A light guide member LGM may guide light exiting from the first to N-th boundary pixels of the boundary pixel BPX to the non-pixel NPX.

In an exemplary embodiment, for example, when 'N' is 2, the boundary pixel BPX may include a first boundary pixel BPX1 and a second boundary pixel BPX2 which are arranged in the first direction DR1. The first boundary pixel BPX1 may be disposed between the second boundary pixel BPX2 and the non-pixel NPX. The light guide member LGM may guide light exiting from the first and second boundary pixels BPX1 and BPX2 to the non-pixel NPX.

The light guide member LGM may include first to sixth light guide members LGM1 to LGM6', the first boundary pixel BPX1 includes first, second and third sub-pixels SPX1, SPX2 and SPX3, and the second boundary pixel BPX2 includes fourth, fifth and sixth sub-pixels SPX4, SPX5 and SPX6. The non-pixel NPX may include the first, second and third non-pixels SNPX1, SNPX2 and SNPX3.

Arrangement of the first, second and third light guide members LGM1, LGM2 and LGM3 regarding the first, second and third sub-pixels SPX1, SPX2 and SPX3 and the first, second and third sub-non-pixels SNPX1, SNPX2 and SNPX3 may be substantially the same as described with reference to FIG. 4, and thus the descriptions thereto are omitted.

The fourth light guide member LGM4 is disposed on the fourth sub-pixel SPX4, extends into the non-active area NAA, and is also disposed on the first sub-non-pixel SNPX1. The fourth light guide member LGM4 guides light exiting from the fourth sub-pixel SPX4 to the first sub-non-pixel SNPX1.

The fifth light guide member LGM5 is disposed on the fifth sub-pixel SPX5, extends into the non-active area NAA, and is also disposed on the second sub-non-pixel SNPX2. The fifth light guide member LGM5 guides light exiting from the fifth sub-pixel SPX5 to the second sub-non-pixel SNPX2.

The sixth light guide member LGM6 is disposed on the sixth sub-pixel SPX6, extends into the non-active area NAA, and is also disposed on the third sub-non-pixel SNPX3. The sixth light guide member LGM6 guides light exiting from the sixth sub-pixel SPX6 to the third sub-non-pixel SNPX3.

Since light is provided from two sub-pixels to one sub-non-pixel, a brightness of light exiting from each of the sub-non-pixels can be improved. Other components may be substantially the same as corresponding components of FIG. 10, and thus the descriptions thereto are omitted. Even though the exemplary embodiment when N=2 is illustrated in FIG. 11, the invention is not limited thereto. Another exemplary embodiment where N is more than 2 can be implemented with the same way as used in FIG. 11.

Figure 12:
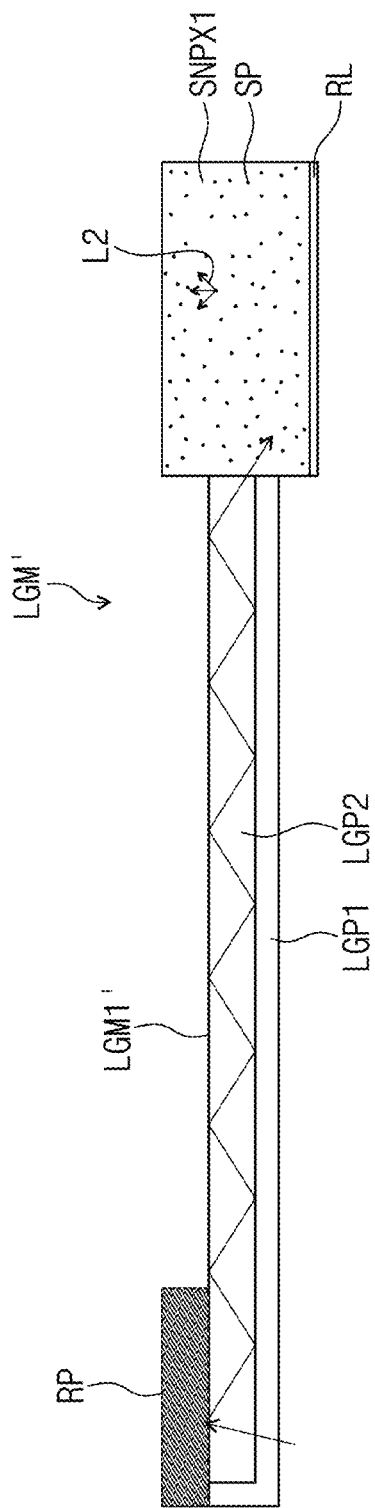
FIG. 12 is a cross-sectional view illustrating an exemplary embodiment of a light guide member of a display apparatus according to the invention.

FIG. 12 is a cross-sectional view illustrating an exemplary embodiment of a light guide member of a display apparatus according to the invention.

A first light guide member LGM1' of a light guide member LGM' is illustrated as an example in the cross-sectional view of FIG. 12.

Referring to FIG. 12, the first light guide member LGM1' includes a reflection part RP, a first light guide part LGP1, and a second light guide part LGP2. The first light guide member LGM1' may be obtained from the light guide member of FIG. 6 by omitting the second reflection part RP2 and by arranging ends of the first and second light guide parts LGP1 and LGP2 in the non-active area NAA, on the same vertical line.

The first and second light guide parts LGP1 and LGP2 extended into the non-active area NAA may be disposed on a side surface of a first sub-non-pixel SNPX1. In more detail, the first and second light guide parts LGP1 and LGP2 may be in contact with the side surface of the first sub-non-pixel SNPX1.

Light exiting from the boundary pixel may be reflected by the reflection part RP so as to be provided to the second light guide part LPG2 and then may be totally reflected in the second light guide part LPG2 and be provided to the first sub-non-pixel SNPX1 of the non-pixel. The first sub-non-pixel SNPX1 includes light-scattering particles SP like the first sub-non-pixel SNPX1 of FIG. 6, and a reflective layer RL may be disposed under the first sub-non-pixel SNPX1. Thus, light scattered in the first sub-non-pixel SNPX1 may exit in an upward direction.

Figure 13:
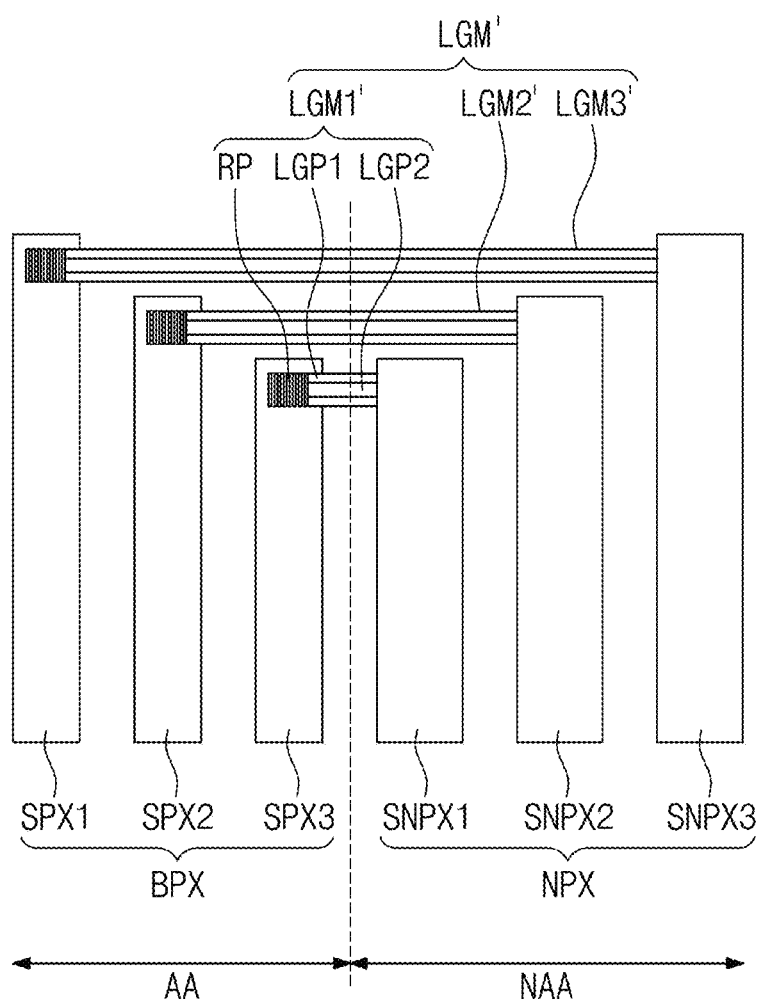
FIG. 13 is a plan view illustrating still another exemplary embodiment of arrangement of a boundary pixel, a non-pixel and a light guide member of a display apparatus according to the invention.

FIG. 13 is a plan view illustrating still another exemplary embodiment of arrangement of a boundary pixel, a non-pixel and a light guide member of a display apparatus according to the invention.

Each of first, second and third light guide members LGM1', LGM2' and LGM3' illustrated in FIG. 13 has substantially the same components as the first light guide member LGM1' illustrated in FIG. 12.

Referring to FIG. 13, a light guide member LGM' includes first, second and third light guide members LGM1', LGM2' and LGM3', a boundary pixel BPX includes first, second and third sub-pixels SPX1, SPX2 and SPX3 sequentially arranged in the first direction DR1, and a non-pixel NPX includes first, second and third sub-non-pixels SNPX1, SNPX2 and SNPX3 sequentially arranged in the first direction DR1.

Sizes of the first, second and third sub-pixels SPX1, SPX2 and SPX3 may be different from each other, and sizes of the first, second and third sub-non-pixels SNPX1, SNPX2 and SNPX3 may be different from each other. The first direction DR1 may include a left direction and a right direction, and sizes of the first, second and third sub-pixels SPX1, SPX2 and SPX3 may sequentially decrease in the right direction. Sizes of the first, second and third sub-non-pixels SNPX1, SNPX2 and SNPX3 may sequentially increase in the right direction.

In an exemplary embodiment, for example, the first sub-pixel SPX1 may be larger than the second sub-pixel SPX2, and the second sub-pixel SPX2 may be larger than the third sub-pixel SPX3. The first sub-non-pixel SNPX1 may be smaller than the second sub-non-pixel SNPX2, and the second sub-non-pixel SNPX2 may be smaller than the third sub-non-pixel SNPX3. As illustrated in FIG. 13, bottom ends of the first to third sub-pixels SPX1 to SPX3 and bottom ends of the first to third sub-non-pixels SNPX1 to SNPX3 may be disposed on the same line when viewed in a plan view.

The first light guide member LGM1' is disposed on the third sub-pixel SPX3, extends into the non-active area NAA, and is also disposed on a side surface of the first sub-non-pixel SNPX1. The second light guide member LGM2' is disposed on the second sub-pixel SPX2, extends into the non-active area NAA, and is also disposed on a side surface of the second sub-non-pixel SNPX2. The third light guide member LGM3' is disposed on the first sub-pixel SPX1, extends into the non-active area NAA, and is also disposed on a side surface of the third sub-non-pixel SNPX3.

The first, second and third light guide members LGM1', LGM2' and LGM3' may be respectively disposed on upper portions of the third, second and first sub-pixels SPX3, SPX2 and SPX1 when viewed in a plan view, and may extend into the non-active area NAA. Ends of the first, second and third light guide members LGM1', LGM2' and LGM3' in the non-active area NAA are respectively disposed at upper portions of the side surfaces of the first, second and third sub-non-pixels SNPX1, SNPX2 and SNPX3 when viewed in a plan view.

By this arrangement structure, the second light guide member LGM2' extends from the second sub-pixels SPX2 to the second sub-non-pixels SNPX2 without passing through the third sub-pixel SPX3 and the first sub-non-pixel SNPX1, and the third light guide member LGM3' extends from the first sub-pixels SPX1 to the third sub-non-pixels SNPX3 without passing through the second and third sub-pixels SPX2 and SPX3 and the first and second sub-non-pixels SNPX1 and SNPX2. In other words, the second light guide member LGM2' does not overlap with the third sub-pixel SPX3 and the first sub-non-pixel SNPX1, and the third light guide member LGM3' does not overlap with the second and third sub-pixels SPX2 and SPX3 and the first and second sub-non-pixels SNPX1 and SNPX2.

Light exiting from the third, second and first sub-pixels SPX3, SPX2 and SPX1 may be provided to the first, second and third sub-non-pixels SNPX1, SNPX2 and SNPX3 through the first, second and third light guide members LGM1', LGM2' and LGM3,' respectively, and then may exit from the first, second and third sub-non-pixels SNPX1, SNPX2 and SNPX3, respectively.

Figure 14:
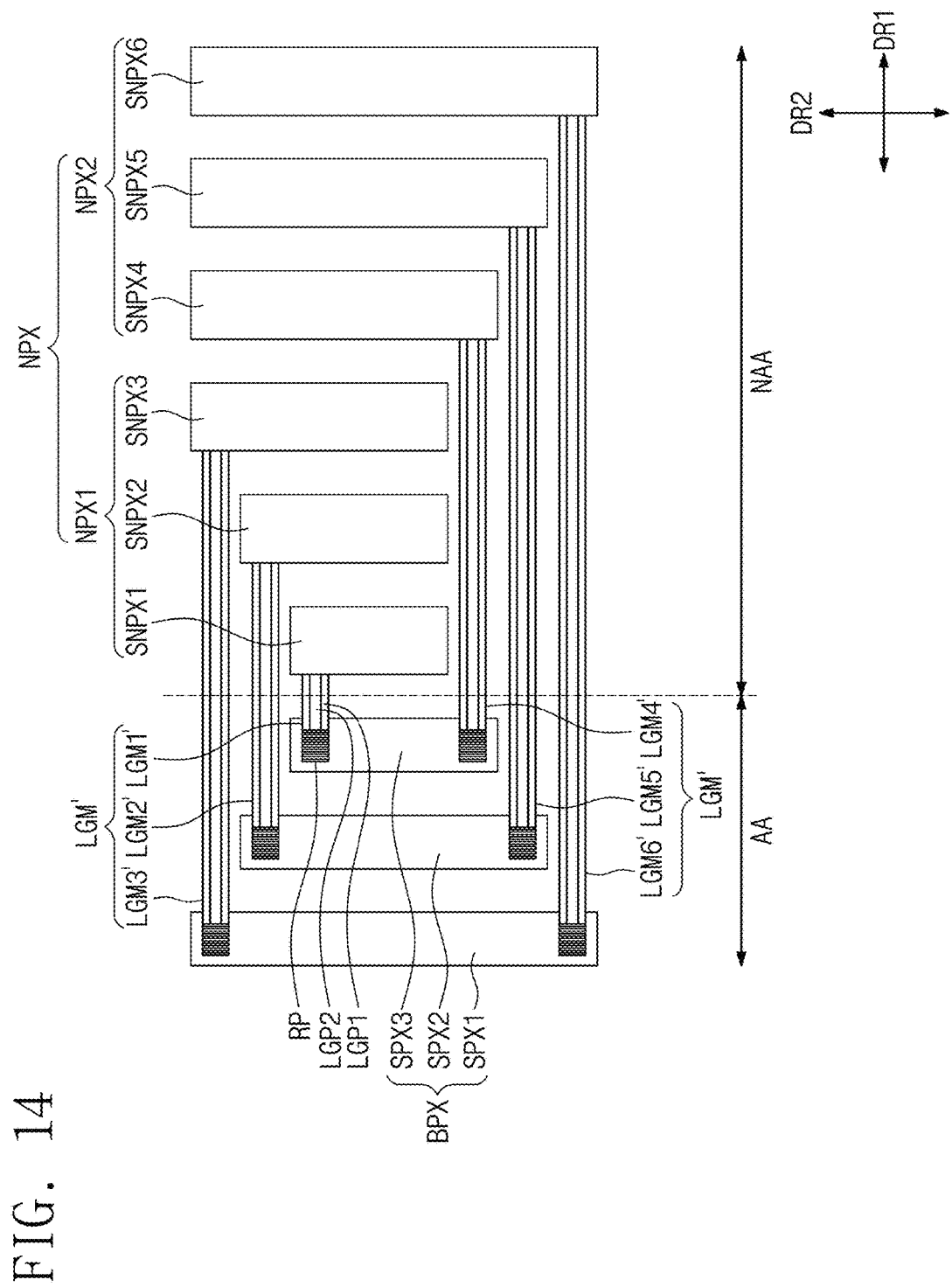
FIG. 14 is a plan view illustrating still another exemplary embodiment of arrangement of a boundary pixel, a non-pixel and a light guide member of a display apparatus according to the invention.

FIG. 14 is a plan view illustrating still another exemplary embodiment of arrangement of a boundary pixel, a non-pixel and a light guide member of a display apparatus according to the invention.

Each of first to sixth light guide members LGM1' to LGM6' illustrated in FIG. 14 has substantially the same components as the first light guide member LGM1' illustrated in FIG. 12.

Referring to FIG. 14, a light guide member LGM' includes first to sixth light guide members LGM1' to LGM6', and a boundary pixel BPX includes first, second and third sub-pixels SPX1, SPX2 and SPX3 sequentially arranged in the first direction DR1. A non-pixel NPX includes first and second non-pixels NPX1 and NPX2. The first and second non-pixels NPX1 and NPX2 include first to sixth sub-non-pixels SNPX1 to SNPX6 sequentially arranged in the first direction DR1.

Sizes of the first, second and third sub-pixels SPX1, SPX2 and SPX3 may sequentially decrease in the right direction, and sizes of the first to sixth sub-non-pixels SNPX1 to SNPX6 may sequentially increase in the right direction. Heights, defined in the second direction DR2, of top ends of the first, second and third sub-pixels SPX1, SPX2 and SPX3 may be sequentially lowered in the right direction. Heights, defined in the second direction DR2, of bottom ends of the first, second and third sub-pixels SPX1, SPX2 and SPX3 may sequentially increase in the right direction. Bottom ends of the first, second and third sub-non-pixels SNPX1, SNPX2 and SNPX3 may be disposed on the same line in a plan view, and top ends of the fourth, fifth and sixth sub-non-pixels SNPX4, SNPX5 and SNPX6 may be disposed on the same line in a plan view.

Arrangement of the first, second and third light guide members LGM1', LGM2' and LGM3' regarding the first to third sub-pixels SPX1 to SPX3 and the first to third sub-non-pixels SNPX1 to SNPX3 may be substantially the same as described with reference to FIG. 13.

The fourth, fifth and sixth light guide members LGM4', LGM5' and LGM6' are disposed on top surfaces of the third, second and first sub-pixels SPX3, SPX2 and SPX1, respectively, in the plan view and are disposed on side surfaces of the fourth, fifth and sixth sub-non-pixels SNPX4, SNPX5 and SNPX6, respectively.

The fourth, fifth and sixth light guide members LGM4', LGM5' and LGM6' may be respectively disposed on lower portions of the third, second and first sub-pixels SPX3, SPX2 and SPX1 when viewed in a plan view, and may extend into the non-active area NAA. Ends of the fourth, fifth and sixth light guide members LGM4', LGM5' and LGM6' in the non-active area NAA are respectively disposed at lower portions of the side surfaces of the fourth, fifth and sixth sub-non-pixels SNPX4, SNPX5 and SNPX6 when viewed in a plan view.

By this arrangement structure, the fourth light guide member LGM4' extends without passing through the first, second and third sub-non-pixels SNPX1, SNPX2 and SNPX3. In other words, the fourth light guide member LGM4' does not overlap with the first, second and third sub-non-pixels SNPX1, SNPX2 and SNPX3. The fifth light guide member LGM5' extends without passing through the third sub-pixel SPX3 and the first to fourth sub-non-pixels SNPX1 to SNPX4. In other words, the fifth light guide member LGM5' does not overlap with the third sub-pixel SPX3 and the first to fourth sub-non-pixels SNPX1 to SNPX4. The sixth light guide member LGM6' extends without passing through the second and third sub-pixels SPX2 and SPX3 and the first to fifth sub-non-pixels SNPX1 to SNPX5. In other words, the sixth light guide member LGM6' does not overlap with the second and third sub-pixels SPX2 and SPX3 and the first to fifth sub-non-pixels SNPX1 to SNPX5.

Light exiting from the first, second and third sub-pixels SPX1, SPX2 and SPX3 may be provided to the first to sixth sub-non-pixels SNPX1 to SNPX6 through the first to sixth light guide members LGM1' to LGM6' and then may exit from the first to sixth sub-non-pixels SNPX1 to SNPX6.

The display apparatus according to the invention may provide light exiting from the boundary pixels adjacent to the boundary between the active area and the non-active area to the non-pixels disposed in the non-active area and may output the light from the non-pixels. Thus, the bezel area of the display apparatus may be reduced.

While the invention has been described with reference to exemplary embodiments, it will be apparent to those skilled in the art that various changes and modifications may be made without departing from the spirits and scopes of the invention. Therefore, it should be understood that the above exemplary embodiments are not limiting, but illustrative. Thus, the scopes of the invention are to be determined by the broadest permissible interpretation of the following claims and their equivalents, and shall not be restricted or limited by the foregoing description.

What is claimed is:

1. A display apparatus comprising:
   a plurality of pixels disposed in an active area;
   a plurality of non-pixels disposed in a non-active area adjacent to the active area; and
   a plurality of light guide members disposed on boundary pixels of the pixels in the active area and which extends into the non-active area and is disposed on the non-pixels in the non-active area,
   wherein the boundary pixels are adjacent to a boundary between the active area and the non-active area, and
   wherein the light guide members guide light exiting from the boundary pixels to the non-pixels.

2. The display apparatus of claim 1, wherein each of the light guide members is disposed on a portion of a corresponding one of the boundary pixels, extends into the non-active area, and is disposed on a portion of a corresponding one of the non-pixels.

3. The display apparatus of claim 1, wherein the light guided to the non-pixels is scattered in the non-pixels and then exits to an outside.

4. The display apparatus of claim 1, wherein each of the pixels comprises:
a portion, of a first substrate, which includes a driving element for driving the pixel;
a portion, of a second substrate, which includes a color filter corresponding to the pixel; and
a portion of a liquid crystal layer disposed between the first substrate and the second substrate,
wherein another portion of the first substrate and another portion of the second substrate extend into the non-active area, and
wherein the light guide members and the non-pixels are disposed on the second substrate.

5. The display apparatus of claim 1, wherein each of the light guide members comprises:
a first reflection member disposed on a corresponding one of the boundary pixels in the active area;
a second reflection member disposed on a corresponding one of the non-pixels in the non-active area; and
a light guide layer disposed between the corresponding boundary pixel and the first reflection member in the active area, and which extends into the non-active area and is disposed between the corresponding non-pixel and the second reflection member in the non-active area.

6. The display apparatus of claim 5, wherein the first reflection member reflects light exiting from the corresponding boundary pixel to the light guide layer,
wherein the light guide layer guides the light received from the first reflection member to the non-active area,
wherein the second reflection member reflects the light, guided to the non-active area, to the corresponding non-pixel, and
wherein the corresponding non-pixel scatters the light received from the second reflection member and then outputs the scattered light.

7. The display apparatus of claim 5, wherein the non-pixels include light-scattering particles and are larger than the pixels.

8. The display apparatus of claim 5, further comprising: a reflective layer disposed under each of the non-pixels.

9. The display apparatus of claim 1, wherein each of the boundary pixels comprises a first sub-pixel, a second sub-pixel and a third sub-pixel which output lights having different colors from each other, and
wherein each of the non-pixels comprises first, second and third sub-non-pixels corresponding to the first, second and third sub-pixels, respectively.

10. The display apparatus of claim 9, wherein each of the light guide members comprises:
a first light guide member disposed on the first sub-pixel and which extends into the non-active area and is disposed on the first sub-non-pixel, wherein the first light guide member guides light exiting from the first sub-pixel to the first sub-non-pixel;
a second light guide member disposed on the second sub-pixel and which extends into the non-active area and is disposed on the second sub-non-pixel, wherein the second light guide member guides light exiting from the second sub-pixel to the second sub-non-pixel; and
a third light guide member disposed on the third sub-pixel and which extends into the non-active area and is disposed on the third sub-non-pixel, wherein the third light guide member guides light exiting from the third sub-pixel to the third sub-non-pixel.

11. The display apparatus of claim 10, wherein each of the first to third light guide members comprises:
a first reflection part disposed on a portion of a corresponding one of the first to third sub-pixels;
a second reflection part disposed on a portion of a corresponding one of the first to third sub-non-pixels;
a first light guide part disposed between the corresponding sub-pixel and the first reflection part in the active area and which extends into the non-active area and is disposed between the corresponding sub-non-pixel and the second reflection part in the non-active area; and
a second light guide part disposed between the corresponding sub-pixel and the first reflection part in the active area and which extends into the non-active area and is disposed between the corresponding sub-non-pixel and the second reflection part in the non-active area, wherein the second light guide part is disposed in a groove that is recessed downward from a predetermined area of a top surface of the first light guide part.

12. The display apparatus of claim 11, wherein a refractive index of the second light guide part is greater than a refractive index of the first light guide part.

13. The display apparatus of claim 11, wherein the first reflection part comprises a plurality of first mediums, and a plurality of second mediums of which a refractive index is different from that of the first mediums,
wherein the first mediums and the second mediums are alternately disposed, and
wherein the first mediums and the second mediums form an angle with respect to a first direction defined as an extending direction of the first and second light guide parts and are inclined toward the non-active area.

14. The display apparatus of claim 13, wherein the angle ranges from about 20 degrees to about 40 degrees, and
wherein a gap between the first mediums range from about 400 nanometers to about 700 nanometers.

15. The display apparatus of claim 11, wherein the second reflection part comprises a plurality of third mediums, and a plurality of fourth mediums of which a refractive index is different from that of the third mediums,
wherein the third mediums and the fourth mediums are alternately disposed, and
wherein the third mediums and the fourth mediums form an angle with respect to a first direction defined as an extending direction of the first and second light guide parts and are inclined toward the active area.

16. The display apparatus of claim 1, wherein each of the non-pixels comprises first to N-th non-pixels,
wherein each of the light guide members guides light exiting from a corresponding one of the boundary pixels to the first to N-th non-pixels of a corresponding one of the non-pixels, and
wherein 'N' is a natural number greater than 1.

17. The display apparatus of claim 1, wherein each of the boundary pixels comprises first to N-th boundary pixels,
wherein each of the light guide members guides light exiting from the first to N-th boundary pixels of a corresponding one of the boundary pixels to a corresponding one of the non-pixels, and
wherein 'N' is a natural number greater than 1.

18. A display apparatus comprising:
a plurality of pixels disposed in an active area;
a plurality of non-pixels disposed in a non-active area adjacent to the active area and which includes light-scattering particles;

a plurality of reflective layers disposed under the non-pixels; and a plurality of light guide members disposed on boundary pixels of the pixels in the active area and which extends into the non-active area and is disposed on side surfaces of the non-pixels in the non-active area, wherein the boundary pixels are adjacent to a boundary between the active area and the non-active area, wherein the light guide members guide light exiting from the boundary pixels to the non-pixels, and wherein the light guided to the non-pixels exits from the non-pixels.

19. The display apparatus of claim 18, wherein each of the boundary pixels comprises first, second and third sub-pixels having different sizes from each other, each of the non-pixels comprises first, second and third sub-non-pixels having different sizes from each other, and each of the light guide members comprises first, second and third light guide members, wherein the first, second and third light guide members are respectively disposed on upper portions of the first, second and third sub-pixels in a plan view and are extended into the non-active area, and wherein the first, second and third light guide members extended into the non-active area are respectively disposed at upper portions of side surfaces of the first, second and third sub-non-pixels in a plan view.

20. The display apparatus of claim 18, wherein each of the boundary pixels comprises first, second and third sub-pixels having different sizes from each other, each of the non-pixels comprises first to sixth sub-non-pixels having different sizes from each other, and each of the light guide members comprises first to sixth light guide members, wherein the first, second and third light guide members of the first to sixth light guide members are respectively disposed on upper portions of the first, second and third sub-pixels in a plan view and are extended into the non-active area, wherein the first, second and third light guide members extended into the non-active area are respectively disposed at upper portions of side surfaces of the first, second and third sub-non-pixels in a plan view, wherein the fourth, fifth and sixth light guide members of the first to sixth light guide members are respectively disposed on lower portions of the first, second and third sub-pixels in a plan view and are extended into the non-active area, and wherein the fourth, fifth and sixth light guide members extended into the non-active area are respectively disposed at lower portions of side surfaces of the fourth, fifth and sixth sub-non-pixels in a plan view.

* * * * *